June 24, 1930.  W. W. SLOANE  1,765,547
CABLE REEL LOCOMOTIVE
Filed Sept. 20, 1928   3 Sheets-Sheet 1
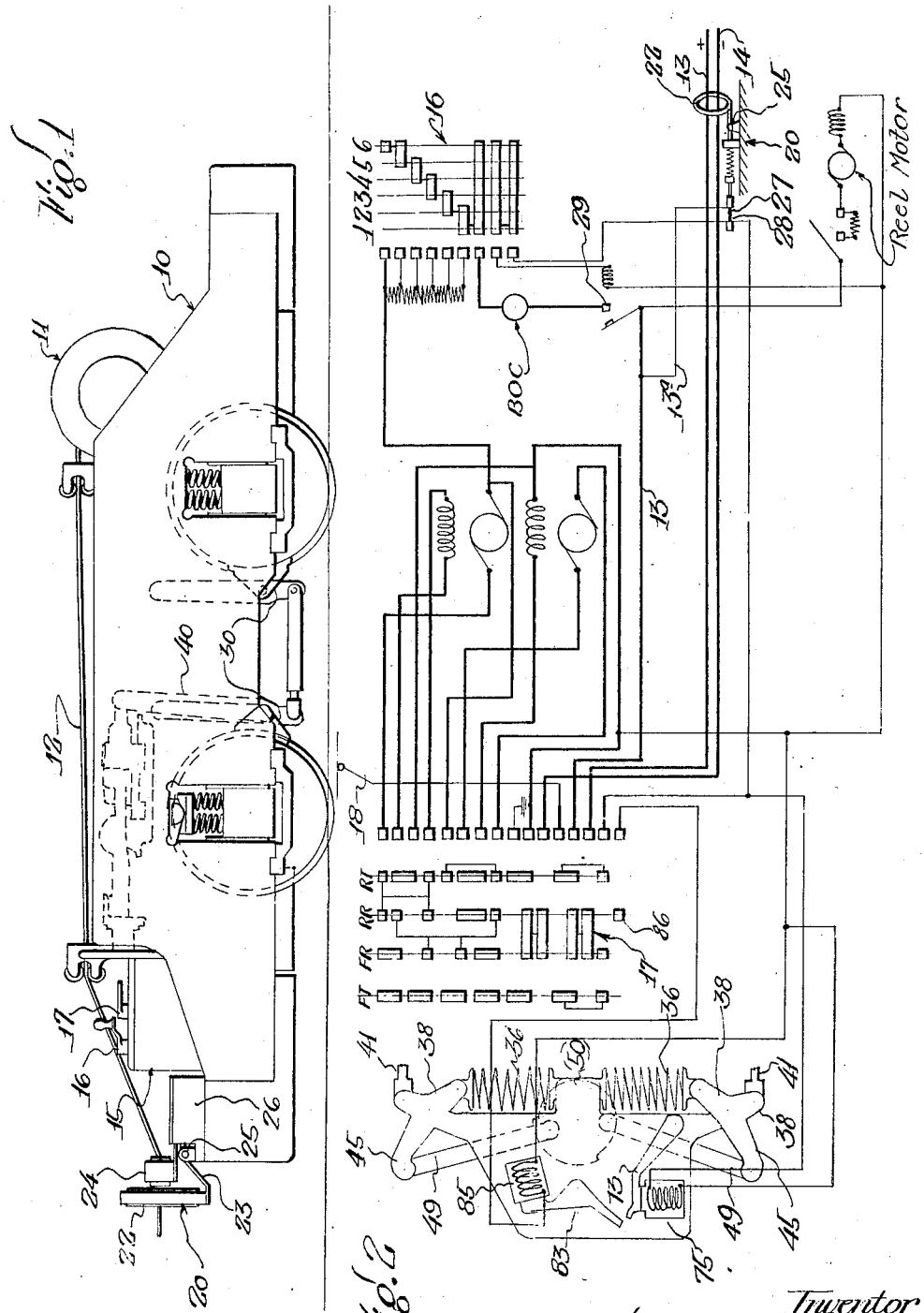

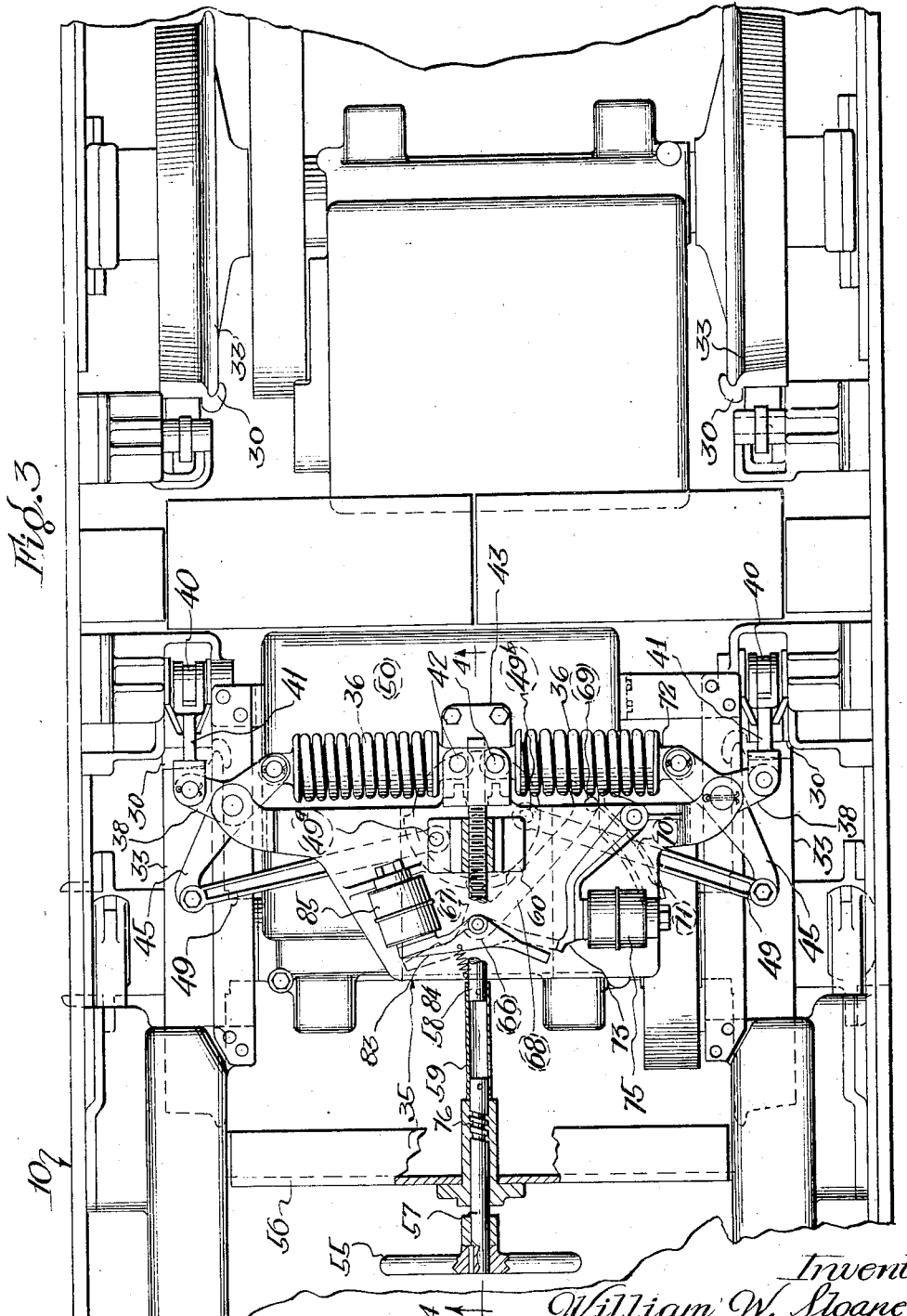

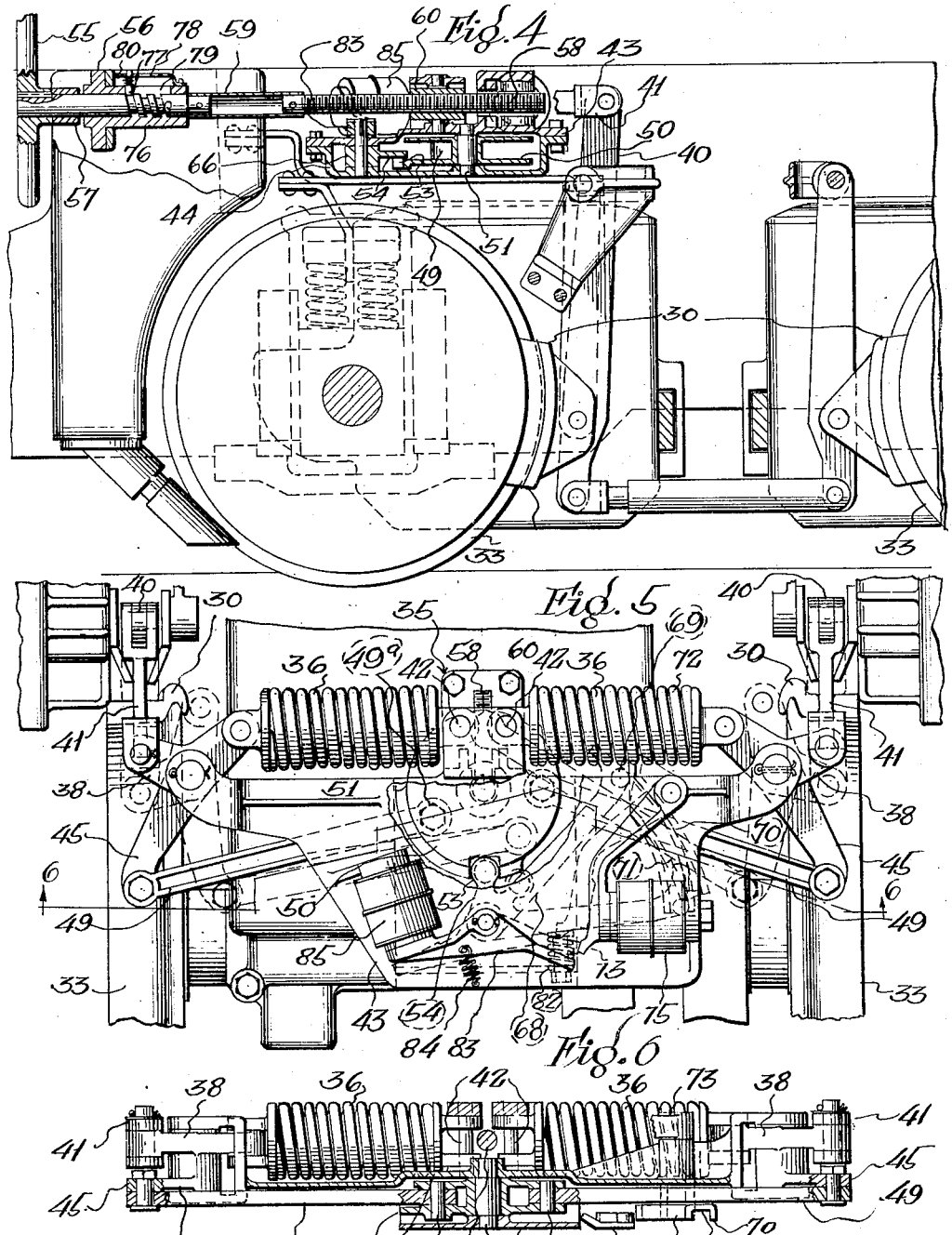

Patented June 24, 1930

1,765,547

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

CABLE-REEL LOCOMOTIVE

Application filed September 20, 1928. Serial No. 307,120.

This invention relates to improvements in cable reel locomotives of the type utilized in gaseous mines and has for its principal object to reduce the hazards accompanying the use of a flexible cable for conducting power to the locomotive, owing to the possibility of accidentally running over the cable while it is in use, and thereby causing an arc sufficient to cause an explosion.

The invention consists in providing a means to prevent the locomotive from running over the cable either accidentally or otherwise.

As heretofore constructed, cable reel locomotives have been provided with automatic means for paying out the cable from the reel while the locomotive is moving away from the point of connection of the cable with the main power line, and means have also been provided for positively winding up the cable on its reel while the locomotive is moving in the opposite direction. To these ends, the cable reel is normally provided with suitable braking devices so that the cable will be unwound therefrom under sufficient tension to keep the cable fairly taut along the mine track, and so as to be readily reeled in as the locomotive returns.

A separate cable reel motor is usually provided with either automatic or manually operated control means to wind in the cable on the reel whenever the locomotive is moving in a reverse direction toward its cable.

In the following description, the term "forward" as applied to movement of the locomotive will be understood to mean movement away from the source of power, and when the cable is being unwound from the reel, while "reverse" movement of the locomotive will be understood to apply to movement toward its source of power connections, and in a direction to wind in the cable.

Among the hazardous conditions sought to be safeguarded by the present invention are those in which the cable is not kept taut when the locomotive is moving in a reverse direction so as to lie on the track and thus become fouled on the track ties, or other obstruction and be run over by the locomotive; or in case the locomotive slides backward by gravity when upon a grade so as to run over the cable; or in case the reel motor fails to start for one reason or another when the locomotive is reversed.

A prior application, Serial Number 282,525, filed by me on June 4, 1928, provides a means for safeguarding against the aforementioned hazardous conditions. My present invention improves on my prior application in that it shows a new and improved method for automatically applying the brakes on the locomotive when the cable is fouled or is otherwise placed in a dangerous position, so as to stop the locomotive before it runs over its cable.

My invention may best be understood by reference to the accompanying drawings wherein:

Figure 1 is a diagrammatic view showing a locomotive with the safety devices embodied in my invention thereon;

Figure 2 is a wiring diagram of the parts of the system carried on the locomotive;

Figure 3 is a fragmentary top plan view of a locomotive having the device of my invention embodied thereon with parts shown in section to more clearly show the details of my invention;

Figure 4 is a cross sectional view taken on line 4—4 of Figure 3;

Figure 5 is an enlarged fragmentary top plan view of a locomotive showing the details of the mechanism for applying and releasing the brakes; and Figure 6 is a fragmentary sectional view taken on line 6—6 of Figure 5.

A locomotive 10 is provided with a cable reel 11 having collector rings of the usual form (not shown) thereon, and cable 12 having two conductor wires 13 and 14 insulated from each other in the usual manner. The locomotive 10 is also provided with a controller 15, including a resistance control drum 16 and a reverse drum 17. Such locomotives are usually provided with a trolley for use in sections of the mine having trolley wire and having sufficient ventilation to safeguard against gaseous conditions. In the form shown, a trolley 18 is provided and is connected with the reverse drum 17 whereby the main power connections may be set at will to operate on the trolley or reel.

The cable reel 11 is of the usual type employed in gathering reel locomotives and is provided with the usual friction means so that the cable is maintained under a definite tension as it is unwound from the reel. Several devices of this character are well known in the art, being usually employed in gathering reel locomotives, so that they need not be described herein in detail. The cable 12 passes from the cable reel 11 rearwardly over the top of the locomotive 10 guided through suitable rollers and through suitable means for automatically controlling the actuation of the brakes whenever the cable becomes fouled or is otherwise in a dangerous abnormal condition. This control means may be responsive either to a predetermined deflection of the cable, or by failure to maintain tension thereon as disclosed in a prior application, Serial Number 200,668, filed by me on June 22, 1927. In the present application the control device consists of a switch 20 responsive to angular deflections of the cable from the normal extended position to shut off current to the locomotive when the cable 12 is not in its normal extended position.

The angular deflection switch 20 is similar to that used in my prior application, aforementioned, and is illustrated generally in Figures 1 and 2. Said angular deflection switch comprises a ring 22 carried on an arm 23 adjacent a fixed guide 24 through which the cable 12 is trained. The arm 23 has a universal joint support 25 and extends into a flame proof casing 26 and has a contact 27 at its inner end which is adapted to register with a contact 28 mounted on the inside of the flame proof casing 26.

Figure 2 shows a contactor 29 in the positive line 13 so arranged as to cut off current in the positive line when said contactor is opened. The contactor 29 is connected with the deflection switch 20 which in turn is connected with the positive line 13 by a jumper 13ª so that the breaking of the contacts 27 and 28 of the deflection switch 20 breaks the circuit through the contactor 29 and thus breaks the circuit through the positive line 13.

It will be observed that, in order to maintain the main operating circuit through the positive line 13 it is necessary not only to maintain a predetermined amount of tension on the cable 12, but also to maintain the cable in its desired extended position from the fixed guide 24, without contacting with the ring 22 of the deflection switch 20.

Any desired angular clearance may be provided for the cable within the ring 22, herein a deflection of about 25 degrees being permissible before the cable will engage the ring 22, to break the deflection switch circuit. This permits a relatively wide range of movement of the cable with respect to the locomotive, as for instance, when the locomotive passes around track curves, but it is fairly sufficient to break the current whenever the cable is in immediate danger of being run over, as for instance, when it becomes fouled on the mine tracks or other obstructions, or whenever there is enough slack in said cable that it is in danger of being run over.

Referring now to the automatic means for applying the brakes on the locomotive to prevent said locomotive from running over the cable 12 when said cable becomes fouled, it may be seen that it is only possible for the locomotive 10 to run over its cable when running in a reverse direction when it is gathering in its cable. My automatic braking device is therefore so arranged that while the current will be shut off from the positive line 13 whenever the cable becomes fouled, the brakes may only be applied when the locomotive is travelling in a reverse direction.

The brakes herein shown are of the ordinary type in common use in mine locomotives whereby pressure on brake shoes 30 applied through a suitable system of levers operated by a screw device causes each of said shoes to bear against a wheel 33 on the locomotive 10 to stop said locomotive and will not herein be described in detail since they are not a part of my invention.

Automatic mechanism for operating the brakes is generally indicated at 35. Said mechanism comprises a transversely extending compression spring 36 on each side of the longitudinal center line of the locomotive 10, each spring having connection at its outer end with one lever arm of a bell crank lever 38, the other arm of which bell crank lever is connected to a brake operating lever 40 by means of a connecting link 41 so that when the springs 36, 36, are simultaneously released they will move the bell crank levers 38 about their pivotal point to apply the locomotive brakes. The inner end of each spring 36 is attached to a pin 42 fixed to a member 43. The member 43 is in the form of a plate and extends transversely of the locomotive frame and has the entire automatic brake operating mechanism 35 attached thereto. A member 44 is attached to the underside of the member 43 to serve as a lower bearing support for the moving parts journaled in the member 43 at their top portion.

Each bell crank lever 38 has a third lever arm 45 integral therewith and extending rearwardly therefrom. Connecting rods 49, 49, are pivoted to the outer end of each of said lever arms and connect said lever arms with a rotatable locking disc 50. The locking disc 50 is mounted on a spindle 51 for rotatable movement thereon on the longitudinal central axis of the locomotive 10. One connecting rod 49 is pivoted to the locking disc 50 at 49$^a$ while the opposite connecting rod 49 is pivoted to the opposite side of the locking disc 50 at 49$^b$. The pivotal point 49$^a$ is rearwardly of the transverse center line of the locking disc 50 while the pivotal point 49$^b$ is forwardly of the transverse center line of the locking disc 50 so that when the compression springs are released by means of the locking disc 50 said disc will always be rotated in a counter-clockwise direction through the lever arms 45, 45, and connecting rods 49, 49. The disc 50 has a locking notch 53 therein engageable by a locking lever 54 to prevent rotation of said locking disc and hold the springs 36, 36, in compression and hold the locomotive brakes in a released position.

When the automatic braking mechanism 35 is locked in an inoperative position, pressure on the brake shoes 30, 30, may be applied on the locomotive wheels 33, 33, manually by means of a hand wheel 55. The hand wheel 55 abuts a transverse supporting member 56 and is keyed on a shaft 57 journaled in said transverse supporting member. The shaft 57 is operatively connected to a threaded shaft 58 by means of a connecting sleeve 59. The threaded shaft 58 is threaded into a member 60 trunnioned to the member 43 on a vertical axis for moving said member longitudinally of the locomotive 10 on rotation of the hand wheel 55 to manually apply the locomotive brakes, the brake operating mechanism 35 acting as a brake beam for connecting the two brake levers 45 with the threaded shaft 58 and threaded member 60.

Referring now in particular to the means for locking the automatic brake operating mechanism 35 in an inoperative position and to the means for releasing the compression springs 36 and allowing said springs to apply the locomotive brakes, it may be observed that the locking lever 54 is integral with one lever arm of a bell crank lever 66 pivoted to the member 43 at 67, and that another lever 68 of said bell crank lever has a pin 69 extending upwardly from its outer end thereof which is adaptable to bear against a side wall 70 of an arcuate guide 71 to prevent movement of the locking lever 54 for locking said automatic brake operating mechanism in an inoperative position. The arcuate guide 71 is fixed to the lower end of a pivotal pin 72 journaled in the member 43 so that pivotal movement of said arcuate guide will allow the pin 69 to drop into said arcuate guide to permit movement of the lever arm 68 of the bell crank lever 66 and the locking disc 50 to apply the locomotive brakes. The arcuate guide 71 is held in locked position by means of a lever 73 fixed to the top portion of the pivotal pin 72 and an electrical magnet 75 which holds the lever 73 from pivotal movement when said magnet is energized by an electrical current. The end of the side wall 70 of the arcuate guide 71 against which the pin 69 of the lever arm 68 has bearing contact is slightly beveled towards said guide so that the pressure of the pin 69 on said guide caused by the compression springs 36, 36, will pivot the arcute guide 71 about its pivotal point the instant the electrical magnet 75 is deenergized and thus release the compression springs 36, 36, to apply the locomotive brakes.

Means are herein provided for compressing the springs 36, 36, and resetting the automatic brake operating mechanism 35, after said mechanism has automatically applied the brakes by means of the hand wheel 55 in the following manner:

The shaft 57 has square threads 76 cut therein for a portion of its length. A rectangular pin 77 is engageable with the threads 76 and is slidable in longitudinal slots 78 and 79. A spring 80 is provided on the rectangular pin 77 to keep said pin in engagement with the threads 76 on the shaft 57. When the brakes have been automatically applied and the springs 36, 36, are distended and it is desired to reset said brakes, the hand wheel 55 is turned in a counter clockwise direction until the pin 77 abuts the rearward portion of the grooves 78 and 79. It may be observed that the threaded shaft 58 is of ample length so that it will not become unthreaded from the member 60 on counter-clockwise rotation of said shaft. Rotation of the hand wheel 55 is continued in a counter-clockwise direction, and as the hand wheel 55 and shaft 57 are moved in a rearward direction, the threaded shaft 58 is also moved rearwardly to move the entire automatic brake operating mechanism rearwardly on the locomotive frame. It may be seen that as the automatic brake operating mechanism 35 is moved rearwardly on the locomotive frame that the bell crank levers 38, 38, move about their pivotal points in a counter clockwise direction and tend to compress the compression springs 36, 36, and that the connecting rods 49, 49, also tend to rotate the locking disc 50 in a clockwise direction.

As the locking disc 50 is rotated in a clockwise direction, the locking lever 54 is forced against the outer periphery thereof by means of a spring actuated plunger 82 on the member 43 which engages the lever arm 68 of the bell crank lever 66, so that the locking lever 54 will be forced into the locking notch 53 when said notch is adjacent the locking lever 54. When the locking lever 54 has engaged the locking notch 53, the hand wheel 55 is rotated until the pin 69 on the lever arm 68 of the bell crank lever 67 is in position to engage the side wall 70 of the arcuate guide 71 at which time said arcuate guide will be pivoted about its pivotal point by means of the electric magnet 75 and lever 73 to prevent movement of the bell crank lever 66 and thus lock the brake operating mechanism 35 in an inoperative position. The brake operating mechanism 35 being locked in an inoperative position it is necessary to release pressure of the brake shoes 30 from the wheels 33. This is accomplished by rotating the hand wheel 55 in a clockwise direction until said hand wheel bears against the transverse supporting member 56 when the hand wheel 55 is rotated in a counter clockwise direction until the locomotive brake shoes 30, 30, are released from the locomotive wheels 33.

An auxiliary locking lever 83 is provided to engage the lever 73 and prevent disengagement of said lever from the electrical magnet 75 except when the locomotive 10 is running in a reverse direction and is obtaining power from its cable reel. A spring 84 serves to engage the auxiliary locking lever 83 with the lever 73 to hold the lever 73 in contact with the electrical magnet 75 while an electrical magnet 85 serves to disengage said auxiliary locking lever from the lever 73.

In Figure 2 it may be observed that the reverse drum 17 serves both as a reverse drum and as a switch to connect the locomotive circuit to either the reel or trolley. It may also be seen that current is supplied to the electrical magnet 85 only when the locomotive 10 is obtaining power from the cable reel 11 and is gathering in the cable on said reel. Therefore, when the drum 17 is on the reverse reel position (abbreviated RR in the drawings) the electrical magnet 85 will be energized by a positive electrical current from a contact 86 on the drum 17 to engage the auxiliary locking lever 83 and thus disengage said locking lever from the lever 73 to allow said lever to be disengaged from the electrical magnet 75 when the electrical current flowing through said magnet is broken.

The electrical circuit through the magnet 75 is broken whenever the drum 17 is on the reverse reel position and the circuit through the angular deflection switch 20 is broken due to fouling or slackness of the cable 12, since breaking of the circuit through the deflection switch 20 breaks the circuit through the contactor 29 and therefore breaks the circuit through the electrical magnet 75. Current flows through the electrical magnet 75 at all times when the drum 17 is on either of the trolley positions or the forward reel position, but only flows through the electrical magnet 85 when the drum 17 is on the reverse reel position, thus making it possible for the lever 73 to be released from the electrical magnet 75 to allow the brakes to be automatically applied when the drum 17 is on the reverse reel position only.

It should be noted that when the locomotive is on the reverse reel position that breaking of the circuit through the electrical magnet 75 does not break the circuit through the electrical magnet 85, and that the circuit through the electrical magnet 85 can only be broken by moving the reverse drum 17 to either one of the trolley positions or to the forward reel position.

It may now be seen that I have provided a mine locomotive of the gathering type, having a cable reel thereon and having brakes which may be automatically applied when said locomotive is gathering in its conductor cable on the cable reel 11 and said cable becomes slack or fouled to prevent running over said cable. It may also be seen that said brakes may be operated by hand in any position of the drum 17 by simply turning the hand wheel 55 in one direction or the other, and that the automatic brake operating mechanism 35 is inoperative except when the drum 17 is in the reverse reel position and the locomotive is gathering in its conductor cable.

It should be observed that when the ends of the cable 12 are being connected to the source of power that the drum 17 should be on the forward reel position to prevent the weight of the cable 12 on the ring 22 of the angular deflection switch 20 from throwing on the brakes. Similarly, when it is desired to gather in the cable 12, the cable reel 11 must start to wind in the cable 12 before the locomotive is started on its rearward journey. The purpose of starting the cable reel 11 to wind in its cable before starting the locomotive is to take up all slack on the cable 12 to prevent said cable from bearing on the ring 22 and applying the locomotive brakes. Thus, all slack must be taken up on the cable 12 before the locomotive 10 may start on its rearward journey to gather in its cable. This prevents the locomotive 10 from starting and running over any slack cable which may be on the track to the rear of said locomotive.

Although I have shown and described one embodiment of my invention, it will be understood that the construction or arrangement of the various parts may be altered or changed and that other means may be used to break the electrical circuit through the locomotive than are shown without departing from the spirit and scope thereof. Furthermore, I do not wish to limit myself to the form illustrated excepting as it may be limited in the appended claims.

I claim as my invention:

1. In combination with a cable reel locomotive, a cable, braking devices for said locomotive, and means on said locomotive responsive to a predetermined deflection or lack of tension of said cable for simultaneously cutting off power from said locomotive and automatically applying said braking devices to stop said locomotive comprising a plurality of compression members, a plurality of bell crank levers having operative connection therewith, and means for connecting said bell crank levers with said braking devices for engaging said braking devices with said locomotive wheels upon release of said compression members.

2. In combination with a cable reel locomotive, a cable, braking devices for said locomotive, and means on said locomotive responsive to a predetermined deflection or lack of tension of said cable for simultaneously cutting off power from said locomotive and automatically applying said braking devices to stop said locomotive comprising a compression member, a lever system having operative connection therewith, means for connecting said lever system with said braking devices, and means for releasing said compression member for applying said braking devices through said lever system.

3. In combination with a cable reel locomotive, a cable, braking devices for said locomotive, and means on said locomotive responsive to a predetermined deflection or lack of tension of said cable for simultaneously cutting off power from said locomotive and automatically applying said braking device to stop said locomotive comprising a compression member, a lever system having operative connection therewith, means for connecting said lever system with said braking devices, and electrically controlled means for releasing said compression member for applying said braking devices by means of said lever system.

4. In combination with a cable reel locomotive, a cable, braking devices for said locomotive, and means on said locomotive responsive to a predetermined deflection or lack of tension of said cable for simultaneously cutting off power from said locomotive and automatically applying said braking device to stop said locomotive comprising a compression member extending transversely of said locomotive, a plurality of lever systems having operative connection therewith, means for connecting said lever systems with said braking devices, and automatic electrically controlled means for releasing said compression member for applying said braking devices through said lever systems.

5. In combination with a cable reel locomotive, a cable, braking devices for said locomotive, and means on said locomotive responsive to a predetermined deflection or lack of tension of said cable for simultaneously cutting off power from said locomotive and automatically applying said braking device to stop said locomotive comprising a compression member, a lever system having operative connection therewith, means for connecting said lever system with said breaking devices, automatic electrically controlled means for releasing said compression member for applying said braking devices through said lever system, and manually operated means for moving said lever system in a direction opposite to the direction of movement of said lever system when actuated by said compression member for recompressing said compression member.

6. In combination with a cable reel locomotive, a cable, braking devices for said locomotive, and means on said locomotive responsive to a predetermined deflection or lack of tension of said cable for simultaneously cutting off power from said locomotive and automatically applying said braking devices to stop said locomotive comprising a compression member, a lever system having operative connection therewith, means for connecting said lever system with said braking devices, automatic electrically controlled means for releasing said compression member for applying said braking devices through said lever system, manually operated means for moving said lever system in a direction opposite to the direction of movement of said lever system when actuated by said compression member for recompressing said compression member, and electrically controlled means for locking said compression member in a compressed position.

7. In combination with a cable reel locomotive, wheels and axles therefor, a cable, braking devices for said locomotive, and means on said locomotive responsive to a predetermined deflection or lack of tension of said cable for simultaneously cutting off power from said locomotive and automatically applying said braking devices to stop said locomotive comprising a plurality of compression members, a separate lever system having connection with each of said compression members, means for connecting said lever systems with said braking devices for engaging said braking devices with said locomotive wheels, and electrically controlled automatic means for releasing said compression members for applying said braking devices through said lever system.

8. In combination with a cable reel locomotive, wheels and axles therefor, a cable, braking devices for said locomotive, and means on said locomotive responsive to a predetermined deflection or lack of tension of said cable for simultaneously cutting off power from said locomotive and automatically applying said braking devices to stop said locomotive comprising a plurality of transversely extending compression members, a plurality of lever systems each of said lever systems being connectible with a compression member, means for connecting said lever systems with said braking devices for engaging said braking devices with said locomotive wheels, and automatic electrically controlled means for releasing said compression members for applying said braking devices through said lever system.

9. In combination with a cable reel locomotive, a cable, braking devices for said locomotive, and means on said locomotive responsive to a predetermined deflection or lack of tension of said cable for simultaneously cutting off power from said locomotive and automatically applying said braking devices to stop said locomotive comprising a plurality of transversely extending compression members, a plurality of lever systems each of said lever systems being connectible with a compression member, means for connecting said lever systems with said braking devices for engaging said braking devices with said locomotive wheels, automatic electrically controlled means for releasing said compression members for applying said braking devices through said lever systems, and manually operated means for moving said lever systems in a direction opposite to the direction of movement of said lever systems when actuated by said compression members for recompressing said compression members and resetting the braking devices after they have been automatically applied.

10. In combination with a cable reel locomotive, a cable, braking devices for said locomotive, and means on said locomotive responsive to a predetermined deflection or lack of tension of said cable for simultaneously cutting off power from said locomotive, and automatically applying said braking devices to stop said locomotive comprising a plurality of transversely extending compression members, a plurality of lever systems each of said lever systems being connectible with a compression member, means for connecting said lever systems with said braking devices for engaging said braking devices with said locomotive wheels, automatic electrically controlled means for releasing said compression members for applying said braking devices through said lever systems, manually operated means for moving said lever systems in a direction opposite to the direction of movement of said lever systems when actuated by said compression members for recompressing said compression members and resetting the braking devices after they have been automatically applied, and electrically controlled means for locking said compression members in a compressed position.

11. In combination with a cable reel locomotive, wheels and axles therefor, a cable, braking devices for said locomotive, said braking devices including brake shoes engageable with said locomotive wheels, manually operated means for engaging or disengaging said brake shoes with said locomotive wheels, auxiliary automatic means for engaging said brake shoes with said locomotive wheels, said auxiliary automatic means comprising a plurality of transversely extending compression members, a lever system having connection with each of said compression members, means for connecting said lever systems with said brake shoes for engaging said brake shoes with said locomotive wheels, electrically controlled automatic means for releasing said compression members for applying said brakes through said lever systems, and means whereby said lever systems may be moved in a direction opposite to the direction of rotation of said lever systems when actuated by said compression members for recompression of said compression members and resetting said brakes after they have been automatically applied, said means being operable through said manually operated means for engaging or disengaging said brake shoes with said locomotive wheels.

12. In combination with a cable reel locomotive, a cable, braking devices for said locomotive, automatic brake operating mechanism responsive to a predetermined deflection on said cable for automatically applying said braking devices to stop said locomotive comprising a plurality of compression members, a lever system operatively connected to each of said compression members, means for operatively connecting said lever systems with said braking devices and means for locking said compression members in a compressed position comprising a lever having operative connection with each of said lever systems, and a rotatable locking disc having operative connection with each of said last mentioned levers.

13. In combination with a cable reel locomotive, a cable, braking devices for said locomotive, automatic brake operating mechanism responsive to a predetermined deflection on said cable for automatically applying said braking devices to stop said locomotive comprising a plurality of compression members, a lever system operatively connected to each of said compression members, means for operatively connecting said lever systems with said braking devices, means for locking said compression members in a compressed position comprising a lever having operative connection with each of said lever systems, a rotatable locking disc having operative connection with each of said last mention levers, and electrically controlled means for holding said locking disc in a stationary position.

14. In combination with a cable reel locomotive, a cable, braking devices for said locomotive, automatic brake operating mechanism responsive to a predetermined deflection on said cable for automatically applying said braking devices to stop said locomotive comprising a plurality of compression members, a lever system operatively connected to each of said compression members, means for operatively connecting said lever systems with said braking devices, and means for locking said compression members in a compressed position comprising a lever having operative connection with each of said lever systems, a rotatable locking disc having operative connection with each of said last mentioned levers, and a lever means for holding said locking disc in a stationary position, and electrically controlled means for allowing said lever to be released from said locking disc.

15. In combination with a cable reel locomotive, a cable, braking devices for said locomotive, automatic brake operating mechanism responsive to a predetermined deflection on said cable for automatically applying said braking devices to stop said locomotive comprising a plurality of compression members, a lever system operatively connected to each of said compression members, means for operatively connecting said lever systems with said braking devices, a third lever having operative connection with each of said lever systems, a rotatable locking disc, means for operatively connecting each of said third levers with said rotatable locking disc whereby said disc may rotate upon release of said aforementioned springs, means for holding said locking disc from rotation, and an electric magnet for allowing said holding means to be released from said disc to allow rotation of said disc.

16. In combination with a cable reel locomotive, a cable, braking devices for said locomotive, automatic brake operating mechanism responsive to a predetermined deflection on said cable for automatically applying said braking devices to stop said locomotive comprising a plurality of compression members, a lever system operatively connected to each of said compression members, means for operatively connecting said lever systems with said braking devices, a third lever having operative connection with each of said lever systems, a rotatable locking disc, means for operatively connecting each of said third levers with said rotatable locking disc whereby said disc may rotate upon release of said aforementioned compression members, a locking lever for holding said locking disc from rotation, a lever connectible with said locking lever to prevent movement of said locking lever, and magnetically controlled means for either preventing movement of said last mentioned lever or for allowing movement of said last mentioned lever upon deenergization of said magnetically controlled means, thereby releasing said locking disc.

17. In combination with a cable reel locomotive, a cable, braking devices for said locomotive, automatic brake operating mechanism responsive to a predetermined deflection on said cable for automatically applying said braking devices to stop said locomotive comprising a plurality of compression members, a lever system operatively connected to each of said compression members, means for operatively connecting said lever systems with said braking devices, a third lever having operative connection with each of said lever systems, a rotatable locking disc, means for operatively connecting each of said third levers with said rotatable locking disc whereby said disc may rotate upon release of said aforementioned compression members, a locking lever for holding said locking disc from rotation, a lever connectible with said locking lever to prevent movement of said locking lever, a pin on the outer extremity of said last mentioned lever, a pivotally movable member engageable by said pin having an arcuate guide thereon, an electrically controlled magnet having connection with said pivotally movable member, and means whereby deenergization of said electrical magnet will allow said pin to pivot said pivotally movable member whereby said pin may ride in said arcuate guide.

18. In combination with a cable reel locomotive, a cable, braking devices for said locomotive, automatic brake operating mechanism for automatically applying said braking devices to stop said locomotive comprising a supporting member, a plurality of compression springs on said supporting member, each of said springs having a bell crank lever operatively connected therewith and pivotally mounted on said supporting member, means for operatively connecting said bell crank levers with said braking devices, and means for compressing said springs and resetting said braking devices, comprising a threaded member, fixed to said supporting member, a shaft threaded through said threaded member having a hand wheel thereon whereby rotation of said hand wheel may move said entire brake operating mechanism in said locomotive frame and rotate said bell crank levers in a direction opposite to the direction of rotation of said levers when rotated by said compression springs for compressing said springs and returning said automatic brake operating mechanism to a normal operating position.

19. In combination with a cable reel, locomotive, a cable, braking devices for said locomotive, automatic brake operating mechanism responsive to a predetermined deflection or lack of tension on said cable for automatically applying said braking devices to stop said locomotive comprising a plurality of compression members, a bell crank lever operatively connected to each of said compression members, means for operatively connecting said bell crank levers with said braking devices, and means for locking said compression members in a compressed position comprising a lever having operative connection with each of said bell crank levers, and a rotatable locking disc having operative connection with each of said last mentioned levers.

Signed at Chicago, in the county of Cook and State of Illinois, this 18th day of September, A. D. 1928.

WILLIAM W. SLOANE.